No. 877,916. PATENTED FEB. 4, 1908.
T. DIAMOND.
ICE HARVESTING MACHINE.
APPLICATION FILED JAN. 14, 1907.
2 SHEETS—SHEET 2.
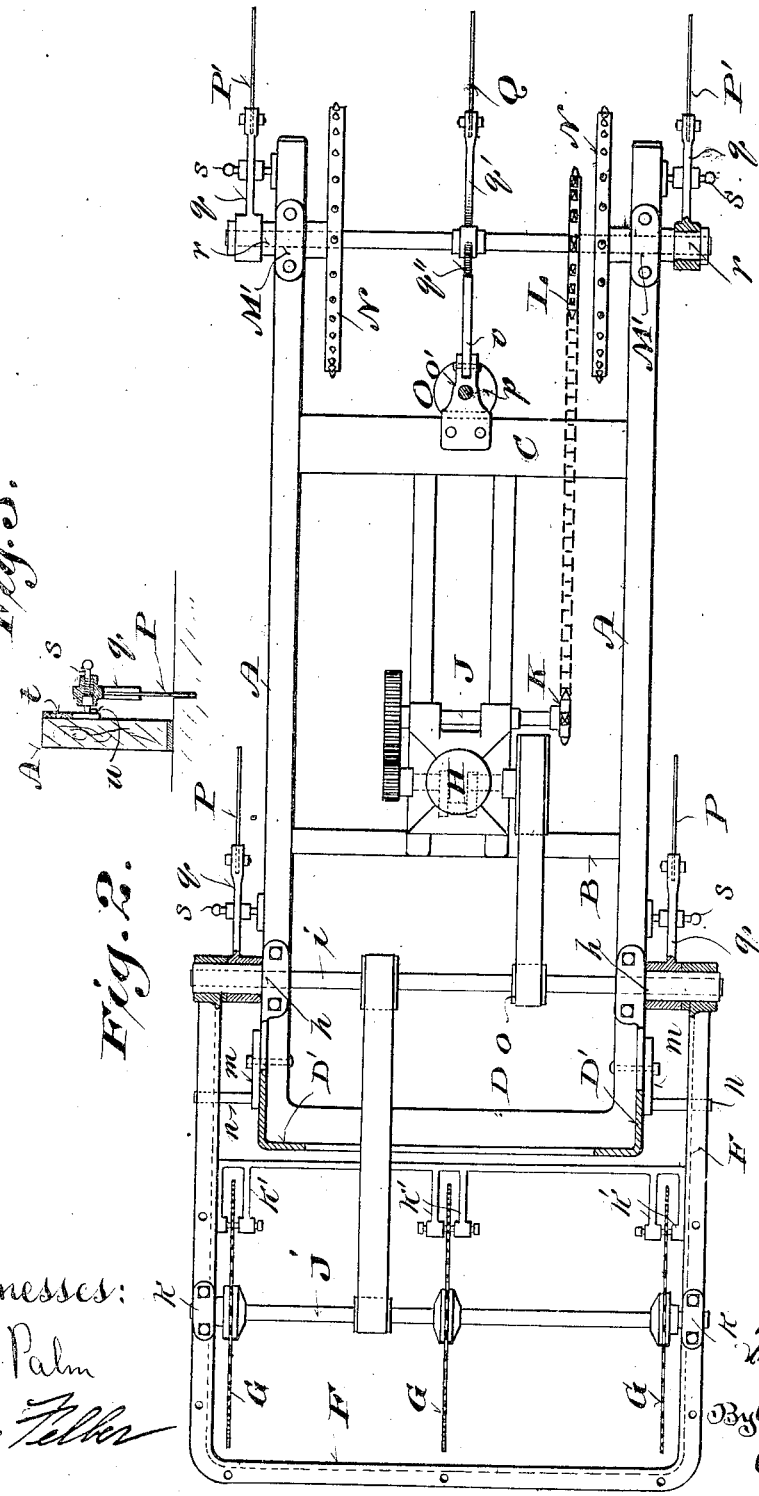

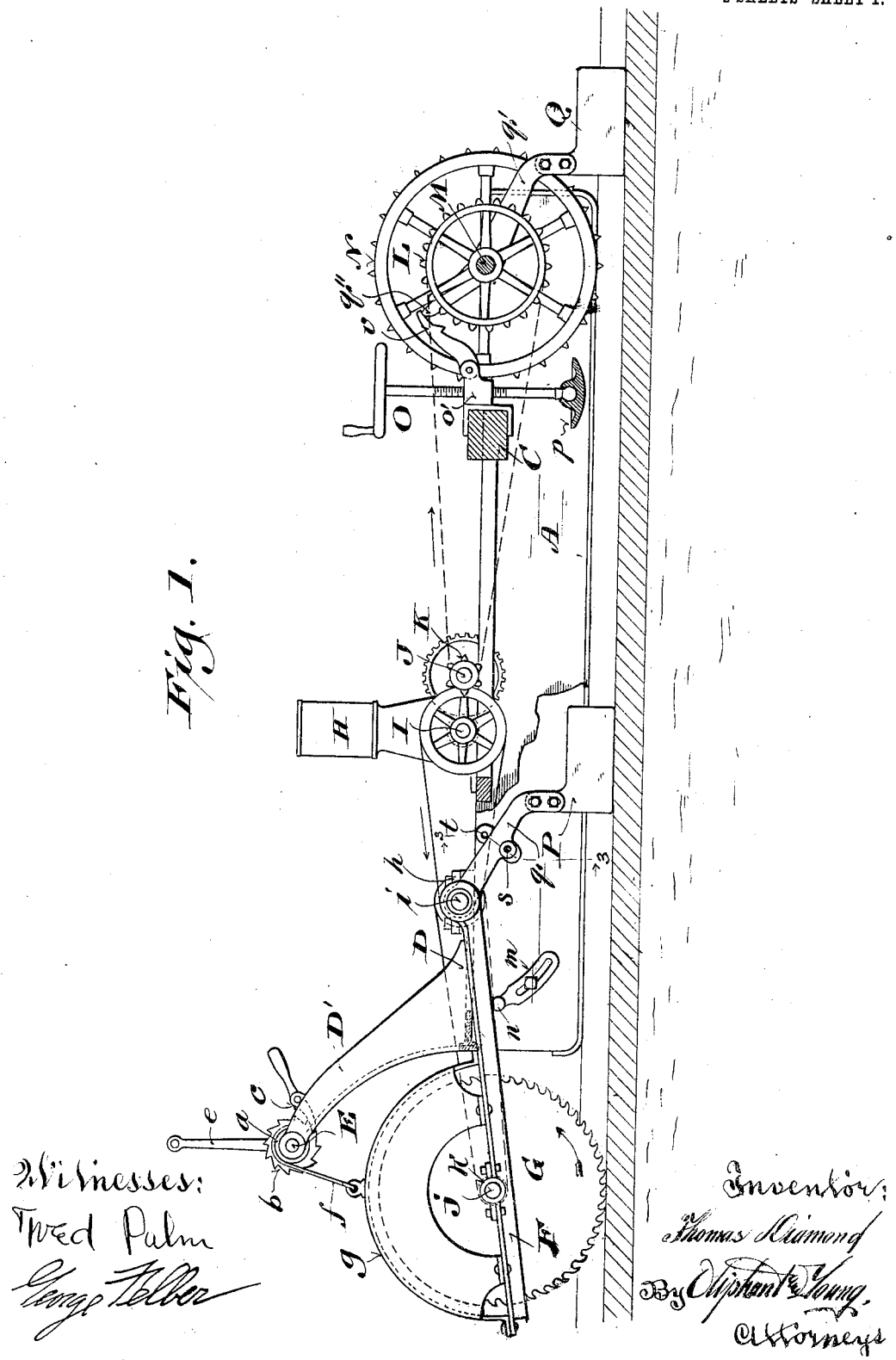

UNITED STATES PATENT OFFICE.

THOMAS DIAMOND, OF WAUKESHA, WISCONSIN.

ICE-HARVESTING MACHINE.

No. 877,916.  Specification of Letters Patent.  Patented Feb. 4, 1908.

Application filed January 14, 1907. Serial No. 352,134.

*To all whom it may concern:*

Be it known that I, THOMAS DIAMOND, a citizen of the United States, and resident of Waukesha, in the county of Waukesha and State of Wisconsin, have invented certain new and useful Improvements in Ice-Harvesting Machines; and I do hereby declare that the following is a full, clear, and exact description thereof.

The object of my invention is to provide a simple and effective machine for cutting ice, said machine being so constructed and arranged as to greatly increase the harvesting of ice over present methods with the least expenditure of skilled labor.

The invention therefore consists in various details of construction and combination of parts as hereinafter fully set forth with reference to the accompanying drawings and subsequently claimed.

In the drawings: Figure 1 represents a side elevation of an ice cutting machine embodying the features of my invention, the view being partly broken away and in section to better illustrate the invention; Fig. 2, a plan view of the same with portions broken away and in section, and Fig. 3, a detail cross-section of one of the runners showing the locking mechanism of a guide-shoe.

Referring by letter to the drawings, A indicates runners suitably braced by stringers B, C, which together with the runners form a rigid frame that serves as a support for the various mechanisms constituting my improved ice-cutter. A bracket D is secured to the rear end of the machine having rearward extending arms D', which terminate in bearings for a shaft E. The said shaft has secured thereto a pair of drums *a* (only one of which is shown) and a ratchet-wheel *b* arranged to be engaged by a dog *c*, which dog is pivoted to one of the bracket-arms. A hand-crank *e* is also secured to the aforesaid shaft for the purpose of winding a pair of cables *f*, which cables are connected to the drum *g*, of a saw carrying bail F. The bail F is mounted upon sleeve-extensions of boxes *h* carried by the bracket D, said boxes being provided for a counter-shaft *i* from which motion is imparted to a saw-arbor *j* through belt-and-pulley or sprocket and chain-drive connection, the saw-arbor being set in bearing *k* secured to the bail F adjacent to the free end thereof. A series of saws G are secured to the arbor *j*, one of which is located centrally of said arbor and the remaining two are spaced equal distances therefrom so that their line of travel is directly outside the track of the runners, there being suitable saw guide-plugs *k*, *k'* carried by the bail F for engagement with the saws to prevent buckling of same.

By the foregoing description it will be understood that the saws may be raised or lowered with the windlass mechanism to regulate the depth of cut, and the said saws may also be raised clear of the ice for transportation or when the machine is to be turned, the ratchet-wheel *b* and dog *c* being provided for locking the saw carrying bail at any desired elevation after the drum-shaft has been revolved by means of the hand-crank. In order to limit the drop of the saws, adjustable stops *m* are secured to the runners, having studs *n*, which studs extend in the path of the bail F and serve as rests for said bail when the latter has reached the desired downward limit.

A motor engine H is secured to the machine-frame, the shaft I of the engine being provided with a pulley in belt-connection with a pulley *o* on the counter-shaft *i*, through which power is transmitted to the saws. The engine-shaft I is also "back-geared" to a shaft J, mounted in bearings on the motor-base, the last named shaft being provided with a sprocket-wheel K that is in link-belt connection with another sprocket-wheel L fast on a shaft M at the forward end of the machine. The shaft M is mounted in boxes M' secured to the runners, and carries a pair of toothed traction-wheels N, the teeth of which wheels are adapted to engage the ice and draw the mechanism forward at the required speed, said speed being such as to permit the saws to cut their way clear the desired depth in the ice, without undue forward pulling-strain caused through the travel of the machine.

In operation, the machine as presently constructed, is propelled forward by the traction-wheels in a straight line, the saws at the same time being driven, cut the first three rows of kerfs in the field of ice, and owing to the traction-wheels being set apart as shown, there will be little tendency for said machine to run other than in the direction desired. When the first row of kerfs have been finished, the machine is turned, by the operator raising the front ends of the runners, through a lifting-jack O, the threaded-spindle of which jack is revoluble in a correspondingly threaded-nut o' secured to the stringer C at the forward end of said machine. The end of the lifting-jack spindle carries a disk p, and when this disk is forced against the ice it lifts the entire front of the runners, bringing the weight at this end upon said disk while the heels of said runners only rest upon the ice at the back of the machine. The saws are then raised by the windlass and the machine may be readily turned by hand and placed in position to cut the next row of kerfs, or a single row as may be desired, in which case two of the saws would be placed in the kerfs previously cut, while the outside saw would be in position to make a fresh cut.

In order to hold the machine parallel with the previous cuts, guide-shoes P, P', are provided at either side of the runners directly in line with the outside saws, and a similar shoe Q at the forward end of the machine is provided to operate in conjunction with the central saw. The rear shoes P are secured to lugs q having hubs which are loosely mounted upon the sleeve-extensions of boxes h. The forward side-shoes P' are similarly provided with legs fitted over sleeve-extensions r of the boxes M' of shaft M. All of these shoes are arranged to be swung up and locked when not in use by spring-controlled plugs s carried by the legs q for engagement with sockets t of plates that are fast on the sides of the runners, the plates being also provided with lugs u against which the plugs rest and thereby prevent the shoes from running too deep when they are in their working positions. The central shoe Q at the forward end of the machine has its leg q' mounted upon the shaft M, said leg being provided with an extension q'' which is adapted to engage and lock under the nose of a dog v, which dog is pivoted between ears of the lifting-jack nut o' and serves to hold the shoe Q out of working position when desired.

By the above described arrangement of shoes, it will be seen that if the machine is cutting one kerf, the center, and one set of side-shoes together with their saws are fitted into the kerfs previously cut, and these shoes will serve not only to clean out the said kerfs, as the machine is propelled, but will also hold the machine in its course as it travels forward and thereby take any undue side-strain from their saws, which saws are now running idle. The side-shoes, in this case, which are in front of the saw that is cutting are locked in their raised position by the plugs as described, it being understood should the device be cutting two kerfs, the center-shoe will also be raised and locked by the dog engaging the leg extension q'' as previously described.

While I have shown and described the machine as being self-propelled, it is obvious that the same may be drawn by horses, if desired, in which case the motor would be used to drive the saws only. The essential features of the device however being one or more vertically adjustable driven circular saws in combination with guide-shoes arranged to travel in previously cut saw kerfs, the entire mechanism being carried by a frame provided with runners. The hood which covers the saws prevents the same from throwing granulated particles of ice over the machine and also protects the operator from being injured by contact with said saws, it being understood that the weight of the saws and the swinging bail is sufficient to hold the same down to cut the desired depth.

While I have shown and described the saws at the rear of the frame, it is obvious that they may be located at the forward end with guide-shoes in advance thereof and also following said saws, and in some instances it may be desirable to substitute a chain-belt and sprocket-wheel drive for the aforesaid saws, in place of the belts and pulleys shown.

I claim:

1. An ice cutting machine comprising a frame having runners and traction-wheels, a vertically adjustable swinging bail in connection with the rear of the frame, a series of rotary saws carried by the bail, a motor engine in gear-connection with the saws and traction-wheels, adjustable guide-shoes in advance of each of said saws and alined therewith, and means for raising the traction-wheels clear of the ice when the frame is to be turned.

2. An ice-cutting machine comprising a frame having runners and traction-wheels, a vertically adjustable swinging-bail in connection with the rear of the frame, adjustable stops carried by said frame in opposition to downward movement of the swinging-bail, a series of rotary saws carried by the bail, a motor in gear-connection with the saws, adjustable guide-shoes in advance of each of said saws and alined therewith, said guides being arranged to travel in kerfs previously cut by the particular saws in which they are lined, and means for raising the traction-wheels clear of the ice when the frame is to be turned.

3. An ice-cutting machine comprising a frame having runners and traction-wheels, a vertically adjustable swinging-bail in connection with the rear of the frame, adjustable stops carried by said frame in opposition to downward movement of the swinging-bail, a series of rotary saws carried by the bail, a motor in gear-connection with the saws, adjustable guide-shoes in advance of each of said saws and alined therewith, said guides being arranged to travel in kerfs previously cut by the particular saws in which they are lined, and a spindle in threaded-connection with the central portion of the frame, whereby the traction-wheels are raised from the ice when said frame is to be turned.

In testimony that I claim the foregoing I have hereunto set my hand at Waukesha in the county of Waukesha and State of Wisconsin in the presence of two witnesses.

THOMAS DIAMOND.

Witnesses:
C. H. JACOB,
A. R. CHAMBERS